Nov. 27, 1951     A. H. WAYNICK     2,576,818
CATHODE-RAY POLAR COORDINATE VECTOR PLOTTER
Filed April 10, 1948
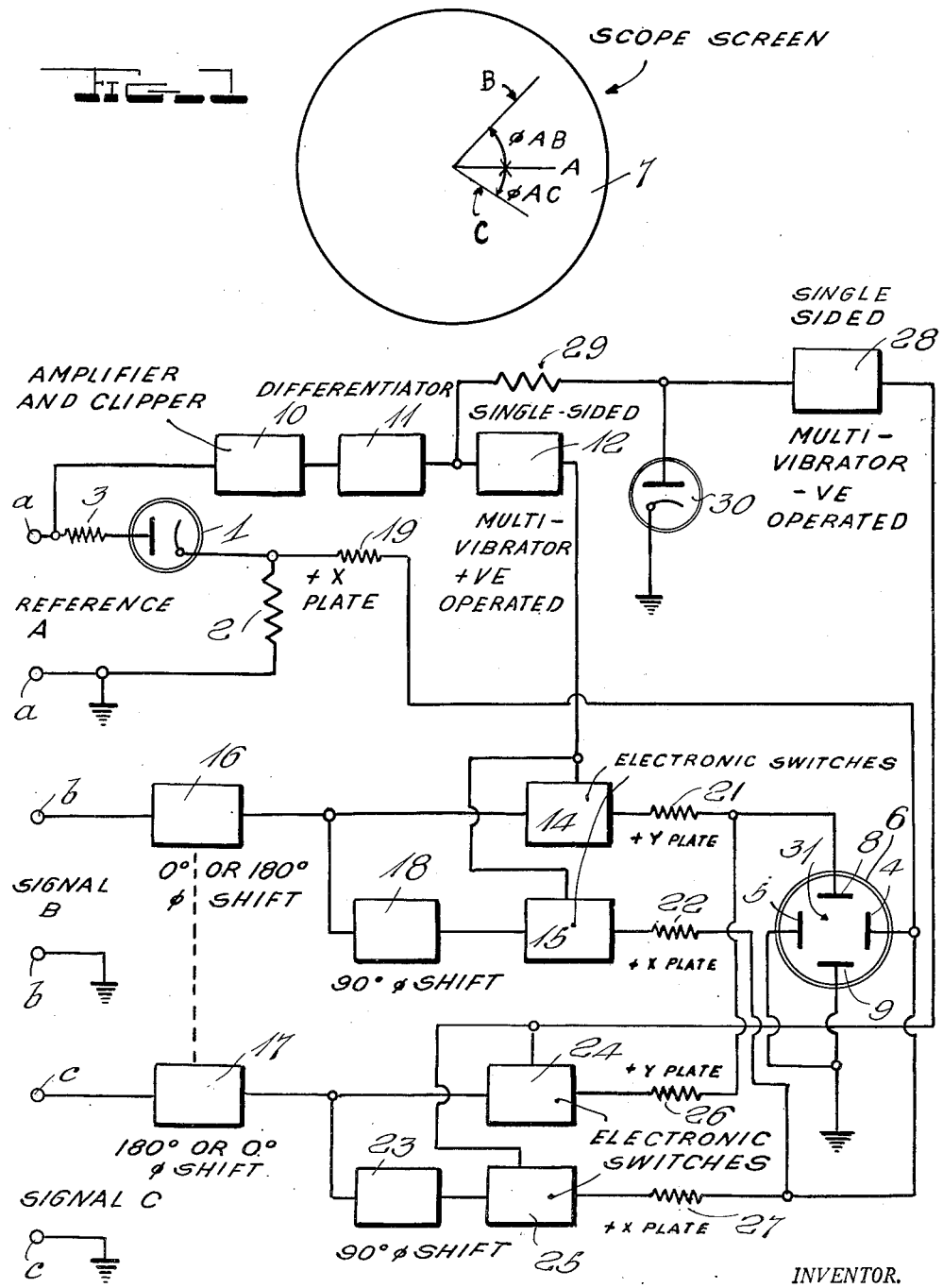
INVENTOR.
Arthur H. Waynick,
BY
John B. Brady
ATTORNEY Patented Nov. 27, 1951

2,576,818

UNITED STATES PATENT OFFICE 2,576,818

CATHODE-RAY POLAR COORDINATE VECTOR PLOTTER

Arthur H. Waynick, State College, Pa., assignor, by mesne assignments, to The Pennsylvania Research Corporation, a corporation of Pennsylvania Application April 10, 1948, Serial No. 20,215

7 Claims. (Cl. 172—245)

My invention relates broadly to measuring instruments and more particularly to a vector presentor for visually displaying conditions in electrical circuits in polar coordinates.

One of the objects of my invention is to provide a circuit arrangement for a cathode ray tube system for visually displaying conditions in a multiplicity of related electrical circuits according to polar coordinates.

Another object of my invention is to provide an arrangement of vector presentor for simultaneously displaying a multiplicity of vector conditions in an electrical circuit where the vectors have a common origin at the center of the oscilloscope screen.

Another object of my invention is to provide a circuit system for directly measuring vector conditions in a multiplicity of electrical circuits and displaying the vector conditions on a cathode ray screen in accordance with phase and voltage conditions existing in the circuits.

Other and further objects of my invention reside in the provision of a precision circuit for a cathode ray polar coordinate vector plotter in simplified form as set forth in the specification hereinafter following by reference to the accompanying drawing, in which:

Figure 1 is a front elevational view of a cathode ray screen illustrating the display of vectors thereon according to conditions in a multiplicity of electrical circuits; and, Fig. 2 is a diagrammatic and schematic circuit arrangement of the cathode ray polar coordinate vector plotter of my invention.

The vector presentor of my invention is a device for presenting simultaneously as many as three lines having a common origin at the center of an oscilloscope screen. The lengths of the lines are proportional to the magnitudes of as many as three voltages simultaneously impressed on the device. The included angles between the lines are equal to the phase angles between the voltages.

Referring to Fig. 1, I have shown a cathode ray oscilloscope screen having displayed thereon electrical conditions in three electrical circuits by vectors A, B and C phased with respect to each other by angle A, B and angle A, C for denoting the vector condition simultaneously existing in the circuit.

Referring to the block diagram, Fig. 2, one voltage, chosen as the reference voltage A, is impressed through terminals A across a diode 1 and load resistor 2 through limiting resistor 3. The drop across the load resistor 2 is applied to the X deflection plates 4—5 of an oscilloscope 6 through isolating resistors 19 in such a manner that the resulting pattern is a straight line with origin at the center of the screen represented at 7 in Fig. 1. The oscilloscope 6 includes in combination with an electronic beam generator the X deflecting plates 4 and 5 and the Y deflecting plates 8 and 9 electrically controlling the sweep of the electronic beam propagated between the electrodes 4, 5, 8 and 9 in the field 31 for bombardment of the sensitized screen 7. The length of the line is proportional to the amplitude of the signal. The line extends along a horizontal axis to the right which is considered zero phase on a polar coordinate system superimposed on a Cartesian coordinate system set up by the sets of deflecting plates shown at 4—5 and 8—9.

The reference signal is also amplified and clipped through apparatus 10 and passed through differentiator 11. This results in positive and negative pips at the zero and 180° phase points of the reference signal respectively. The positive pips actuate a single sided, positive operated, triggered multi-vibrator 12 which remains actuated for a suitable length of time independent of the input signal amplitude and frequency. This time is chosen to be short in terms of the signal period; about $1/360$. When the multi-vibrator 12 is triggered it actuates two electronic switches 14 and 15 shown in the output of the signal B circuit.

Signal B is applied at terminal $b$ through a 0° or 180° phase shifter shown at 16 to the input of one of the switching tubes 14 directly and through a 90° network 18 to the input of the other switching tube 15. Electronic switch 14 connects to the Y plates 8 and 9 through isolating resistor 21, while electronic switch 15 connects to the X plates 4—5 through isolating resistor 22. As heretofore indicated, these switches 14 and 15 are closed when the reference signal goes through zero phase and for a short time thereafter, and are open for the remainder of the time. A description of the operation is most easily explained mathematically:

Let $$e_A = E_A \sin wt$$

be the reference signal where $e_A$ is the instantaneous value of the reference voltage and $E_A$ is the maximum value of the reference voltage and obtains when $$wt = \frac{(2n-1)}{2}\pi$$

where $n$ is a positive integer.

Let $$e_B = E_B \sin (wt + \phi_B)$$

where $\phi_B$ is the phase angle between $e_A$ and $e_B$.

If the two switches 14 and 15, effective in the B signal circuit are open, no B signal is applied to the deflection plates and a spot at the origin, or the A signal line, appears on the scope face 7.

When $e_A$ goes through 0° the B switches 14 and 15 are closed and a voltage $$e_{BY} = E_B \sin(wt + \phi_B)$$

is applied to the Y plates 8 and 9. Simultaneously a voltage $$e_{BX} = E_B \sin\left(wt + \phi_B + \frac{\pi}{2}\right)$$
$$= E_B \cos(wt + \phi_B)$$

is applied to the X plates 4 and 5.

$\frac{\pi}{2}$ appears in this expression due to the 90° line. The net deflection voltage actuating the spot is then $$e'_B = E_B (\cos\phi_B + j \sin\phi_B)$$

where $j$ is a space operator accounting for the 90° position of the deflecting plates. $wt$ has disappeared due to the fact that the time in question is when $wt = 2n\pi$ in terms of the reference phase.

In polar coordinates the net deflection voltage and consequent deflection obtained is $$e'_B = E_B e^{j \tan^{-1}\frac{\sin\phi_B}{\cos\phi_B}}$$
$$= E_B e^{j\phi_B}$$

This is a vector, or line on the scope face 7, having an amplitude $E_B$ and at an angle with respect to the reference trace of $\phi_B$ as desired.

Signal C applied at terminal c may be treated in the same manner as signal B with the following differences. The reference signal C circuit includes the 180° or 0° phase shifter 17 connected to one of the electronic switches 24 directly abd through a 90° phase shifter 23 to the other electronic switch 25. Electronic switch 24 connects to the Y plates 8 and 9 through isolating resistor 26 while electronic switch 25 connects to X plates 4 and 5 through isolating resistor 27. The circuits are coordinated in their mutual operation by the connection of a single-sided negative-operated triggered multi-vibrator 28 connected from differentiator 11 through limiting resistor 29 and the half wave rectifier 30 with the electronic switches 24 and 25 as shown. It is necessary that the line representing signal C voltage be swept across the tube face 7 at some time when the lines B and A are not being swept out. This is accomplished by closing the C switches when the reference signal goes through 180°; i. e., when $wt = (2n-1)\pi$. Suitable phasing is obtained by adding a 180° phase shift in the C circuit as shown.

It is evident that the three lines constituting the display are swept out at different times and, for the B and C signals, during the time of closure of the switches. Visual integration is obtained by the oscilloscope phosphor and persistence of vision so that the three lines appear simultaneously to the observer.

In operation, the two multi-vibrators 12 and 28 are triggered respectively by the positive and negative pips resulting from differentiation of the output of the amplifier and clipper 10 whose output, in turn, is due to the reference signal A. This triggering causes the multi-vibrators 12 and 28 to put out a rectangular pulse having a length of approximately 1/360 or one angular degree of wave length of reference signal A. Since the two multi-vibrators 12 and 28 are positively and negatively operated, the positively initiated pulse occurs at 0° phase with respect to reference A, while the negatively triggered pulse occurs at 180° phase with respect to reference A. Each positive and negative pulse triggers the two electronic switches 14 and 15 and two electronic switches 24 and 25, respectively, to which it has been introduced, causing those switches, for a time equivalent to the length of the pulse, to pass the component of signal B or signal C with whatever amplitude they may have at that time. Thus, the two components of signals B and C are applied to the oscilloscope deflection electrodes 4—5 and 8—9 in such a way as to give vector lines on the oscilloscope face angles of orientation of which with the positive horizontal are the phase angles between those signals and reference signal A and the amplitudes of which are proportional to the amplitudes of signal B and C, respectively. On a time basis, signal B will appear first on the oscilloscope face; reference signal A, after passing through the half-wave rectifier 30 then appears on the oscilloscope face as a positive horizontal line of amplitude proportional to the amplitude of signal A and providing a zero phase reference for the other two vectors; signal C then appears followed by a half-period of no signal to the oscilloscope.

For the case illustrated, the oscilloscope pattern will be that illustrated in Fig. 1, with phase angles approximately as follows:

$$\phi AB \approx +45°$$
$$\phi AC \approx -30°$$

I have found the cathode ray polar coordinate vector plotter of my invention very efficient for quickly analyzing conditions in a plurality of co-acting electrical circuit systems. I realize, however, that modification in detail of the circuit may be made and I desire that it be understood that no limitations upon my invention are intended other than may be imposed by the scope of the appended claims.

What I claim as new and desire to secure by Letters Patent of the United States is as follows:

1. A vector presentor comprising in combination, an oscilloscope including a screen for reproducing vectors under bombardment by an electron beam, sets of control electrodes for controlling the vectorial sweep of the beam over said screen, a plurality of input circuits excitable from signal energy, one of said input circuits being excitable from a reference signal voltage, a pair of multi-vibrator circuits having inputs and outputs, connections between said last mentioned input circuit with the inputs of said pair of multi-vibrator circuits, two pair of electronic switches, the output of one of said multi-vibrator circuits being connected with one pair of said electronic switches and the output of the other of said multi-vibrator circuits being connected with the other pair of said electronic switches, connections from said electronic switches to said sets of control electrodes, said electronic switches being closed when the reference signal voltage passes through zero phase and for a short period thereafter and opened for the remainder of the time for determining the phase points of the reference voltage, and means for applying signal energy from said other input circuits to said sets of control electrodes at the reference phase instances for vectorially controlling the sweep of the electron beam with respect to said screen for visually reproducing the phase angles of the currents applied to said input circuits, together with an intermediate reference line established by currents applied to said first mentioned input circuit.

2. A vector presentor as set forth in claim 1, in which a rectifier is interposed between said first mentioned input circuit and the circuit connections to said sets of control electrodes.

3. A vector presentor as set forth in claim 1, in which one of said multi-vibrators operates at positive polarity and the other of said multi-vibrators operates at negative polarity for selectively controlling the respective pairs of electronic switches connected therewith.

4. A vector presentor as set forth in claim 1, in which phase shift means are interposed between said last mentioned input circuits and said pair of electronic switches for controlling the sweep of the electron beam incident to the signal currents applied to said last mentioned input circuits and rendering the electron beam successively effective under control of the respective input circuits for reproducing visual traces on said oscilloscope screen in recurring displaced time sequence.

5. A vector presentor comprising in combination, an oscilloscope including a screen for reproducing vectors under bombardment by an electron beam, sets of control electrodes for controlling the vectorial sweep of the beam over said screen, a plurality of input circuits excitable from signal energy, one of said input circuits being excitable from a reference signal voltage, a pair of multi-vibrator circuits having inputs and outputs, connections between said last mentioned input circuit with the inputs of said pair of multi-vibrator circuits, two pair of electronic switches, the output of one of said multi-vibrator circuits being connected with one pair of said electronic switches and the output of the other of said multi-vibrator circuits being connected with the other pair of said electronic switches, connections from said electronic switches to said sets of control electrodes, said electronic switches being closed when the reference signal voltage passes through zero phase and for a short period thereafter and opened for the remainder of the time for determining the phase points of the reference voltage, phase shift means interposed between said other input circuits and one of each of the electronic switches of said pair of electronic switches and additional phase shift means connected between said last mentioned phase shift means and the other electronic switches of each of said pair of electronic switches respectively for controlling the sweep of the electron beam incident to the signal currents applied to said last mentioned input circuits successively under control of the respective input circuits and in recurring displaced time sequence for vectorially controlling the sweep of the electron beam with respect to said screen for visually reproducing the phase angles of the currents applied to said last mentioned input circuits together with an intermediate reference line established by currents applied to said first mentioned input circuit.

6. A vector presentor comprising in combination, an oscilloscope including a screen for reproducing vectors under bombardment by an electron beam, sets of control electrodes for controlling the vectorial sweep of the beam over said screen, a plurality of input circuits excitable from signal energy, one of said input circuits being excitable from a reference signal voltage, a pair of multi-vibrator circuits having inputs and outputs, connections between said last mentioned input circuit with the inputs of said pair of multi-vibrator circuits, two pair of electronic switches, the output of one of said multi-vibrator circuits being connected with one pair of said electronic switches and the output of the other of said multi-vibrator circuits being connected with the other pair of said electronic switches, connections from said electronic switches to said sets of control electrodes, said electronic switches being closed when the reference signal voltage passes through zero phase and for a short period thereafter and opened for the remainder of the time for determining the phase points of the reference voltage, a 0° or 180° phase shift circuit interposed between one of said last mentioned input circuits and one set of said electronic switches and a 180° or 0° phase shift circuit interposed between another of said last mentioned input circuits and said other set of electronic switches, respectively, for controlling the sweep of the electron beam incident to the signal currents applied to said last mentioned input circuits successively under control of the respective input circuits and in recurring displaced time sequence for vectorially controlling the sweep of the electron beam with respect to said screen for visually reproducing the phase angles of the currents applied to said last mentioned input circuits together with an intermediate reference line established by currents applied to said first mentioned input circuit.

7. A vector presentor comprising in combination, an oscilloscope including a screen for reproducing vectors under bombardment by an electron beam, sets of control electrodes for controlling the vectorial sweep of the beam over said screen, a plurality of input circuits excitable from signal energy, one of said input circuits being excitable from a reference signal voltage, a pair of multi-vibrator circuits having inputs and outputs, connections between said last mentioned input circuit with the inputs of said pair of multi-vibrator circuits, two pair of electronic switches, the output of one of said multi-vibrator circuits being connected with one pair of said electronic switches and the output of the other of said multi-vibrator circuits being connected with the other pair of said electronic switches, connections from said electronic switches to said sets of control electrodes, said electronic switches being closed when the reference signal voltage passes through zero phase and for a short period thereafter and opened for the remainder of the time for determining the phase points of the reference voltage, a 0° or 180° phase shift circuit interposed between one of said last mentioned input circuits and one of the electronic switches of one pair of said electronic switches, an additional 90° phase shift circuit connected between the aforesaid phase shift circuit and the other electronic switch of said last mentioned pair of electronic switches and a 180° or 0° phase shift circuit interposed between another of said last mentioned input circuits and one of the electronic switches of said other pair of said electronic switches, an additional 90° phase shift means connected between the last mentioned phase shift circuit and the other electronic switch of said last mentioned pair of said electronic switches, respectively, for controlling the sweep of the electron beam incident to the signal currents applied to said last mentioned input circuits successively under control of the respective input circuits and in recurring displaced time sequence for vectorially controlling the sweep of the electron beam with respect to said screen for visually reproducing the phase angles of the currents applied to said last mentioned input circuits together with an intermediate reference line established by currents applied to said first mentioned input circuit.

ARTHUR H. WAYNICK.

REFERENCES CITED

The following references are of record in the file of this patent:

UNITED STATES PATENTS

| Number | Name | Date |
|---|---|---|
| 2,012,480 | Reich | Aug. 27, 1935 |
| 2,089,430 | Roys et al. | Aug. 10, 1937 |
| 2,221,115 | Shepard | Nov. 12, 1940 |
| 2,318,197 | Clark | May 4, 1943 |
| 2,366,357 | Schlesinger | Jan. 2, 1945 |